United States Patent [19]
Evanger et al.

[11] Patent Number: 5,125,233
[45] Date of Patent: Jun. 30, 1992

[54] ENERGY CONVERSION APPARATUS

[76] Inventors: John A. Evanger, 8910 116th St. SW., Tacoma, Wash. 98498; Rory A. Ellison, P.O. Box 764, Roy, Wash. 98580

[21] Appl. No.: 714,919

[22] Filed: Jun. 13, 1991

[51] Int. Cl.$^5$ .......................... F03B 9/00; F03G 7/00
[52] U.S. Cl. ........................... 60/496; 60/675
[58] Field of Search .......................... 60/495, 496, 675

[56] References Cited

U.S. PATENT DOCUMENTS

| | | | |
|---|---|---|---|
| 389,515 | 9/1988 | Iske | 60/675 |
| 3,509,716 | 5/1970 | Avery | 60/675 |
| 4,074,534 | 2/1978 | Morgan | 60/675 X |
| 4,326,132 | 4/1982 | Bokel | 60/496 X |

*Primary Examiner*—Allen M. Ostrager
*Attorney, Agent, or Firm*—Leon Gilden

[57] ABSTRACT

An apparatus wherein adjacent tubes are arranged directing fluid containing vessels therebetween, wherein the vessels are mounted upon an endless belt supported by upper and lower pulleys. The vessels are alternatively heated and cooled within the respective conduits to effect continuous rotation of the belt and conversion of heated energy to mechanical energy.

5 Claims, 5 Drawing Sheets

ENERGY CONVERSION APPARATUS

BACKGROUND OF THE INVENTION

1. Field of the Invention

The field of invention relates to energy apparatus, and more particularly pertains to a new and improved energy conversion apparatus wherein the same effects conversion of heat to mechanical energy.

2. Description of the Prior Art

The utilization of heated air rising with association of cooled fluid, such as water descending, is utilized to effect continuous rotation of an associated pulley. The prior art utilizes various principles of rising hot air to effect manipulation of various apparatus. For example U.S. Pat. No. 4,174,082 to Eshoo sets forth a solar powered balloon utilizing a transparent portion to utilize solar heating to heat air within the balloon and effect its rising.

U.S. Pat. No. 4,651,956 to Winker sets forth an inflation control system for hot air balloons utilizing heated air to effect rising and descent of such balloon structure.

As such, it may be appreciated that there continues to be a need for a new and improved energy conversion apparatus as set forth by the instant invention which addresses both the problems of ease of use as well as effectiveness in construction utilizing balloon structure to effect conversion of heated energy to mechanical energy and in this respect, the present invention substantially fulfills this need.

SUMMARY OF THE INVENTION

In view of the foregoing disadvantages inherent in the known types of energy apparatus now present in the prior art, the present invention provides an energy conversion apparatus wherein the same utilizes conversion of heated energy to mechanical energy. As such, the general purpose of the present invention, which will be described subsequently in greater detail, is to provide a new and improved energy conversion apparatus which has all the advantages of the prior art energy apparatus and none of the disadvantages.

To attain this, the present invention provides an apparatus wherein adjacent tubes are arranged directing fluid containing vessels therebetween, wherein the vessels are mounted upon an endless belt supported by upper and lower pulleys. The vessels are alternatively heated and cooled within the respective conduits to effect continuous rotation of the belt and conversion of heated energy to mechanical energy.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved energy conversion apparatus which has all the advantages of the prior art energy apparatus and none of the disadvantages.

It is another object of the present invention to provide a new and improved energy conversion apparatus which may be easily and efficiently manufactured and marketed.

It is a further object of the present invention to provide a new and improved energy conversion apparatus which is of a durable and reliable construction.

An even further object of the present invention is to provide a new and improved energy conversion apparatus which is susceptible of a low cost of manufacture with regard to both materials and labor, and which accordingly is then susceptible of low prices of sale to the consuming public, thereby making such energy conversion apparatus economically available to the buying public.

Still yet another object of the present invention is to provide a new and improved energy conversion apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3A is a top view of FIG. 3.

FIG. 4A is a top view of FIG. 4.

DESCRIPTION OF THE PREFERRED EMBODIMENT

Figure 1:
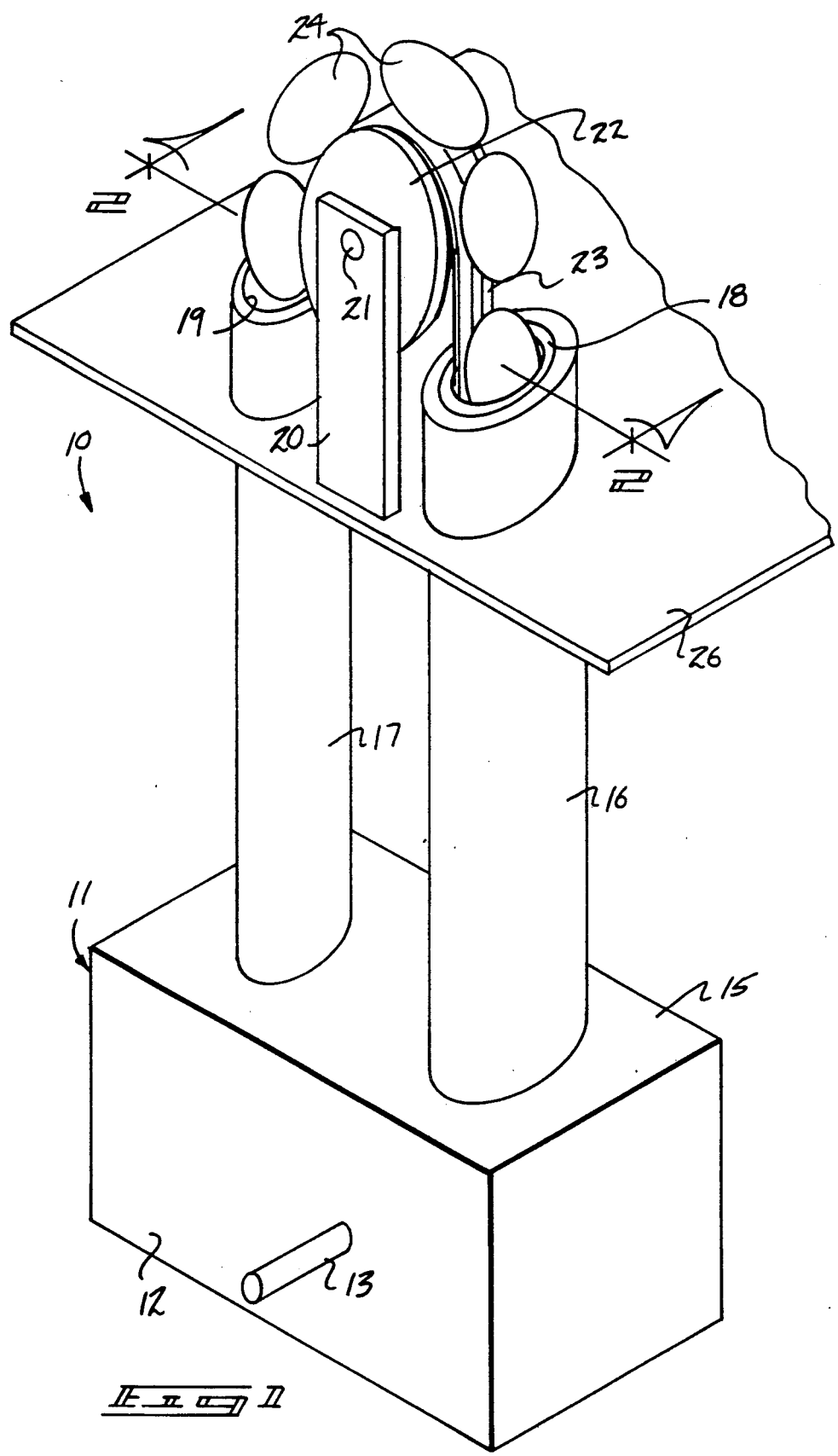
FIG. 1 is an isometric illustration of the instant invention.
Figure 2:
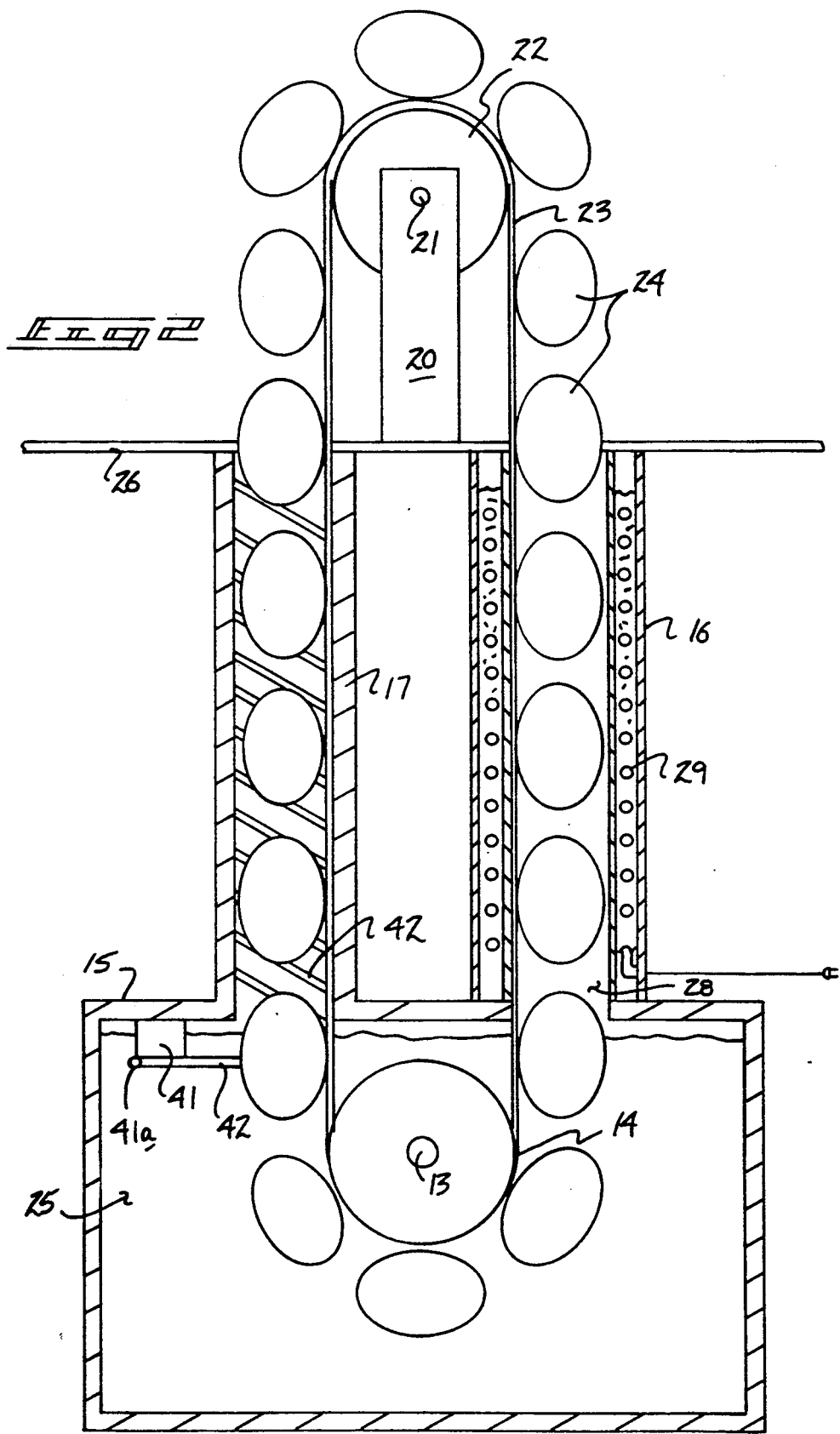
FIG. 2 is an orthographic side view of the instant invention, taken along the lines 2—2 of FIG. 1 in the direction indicated by the arrows.
Figure 3:
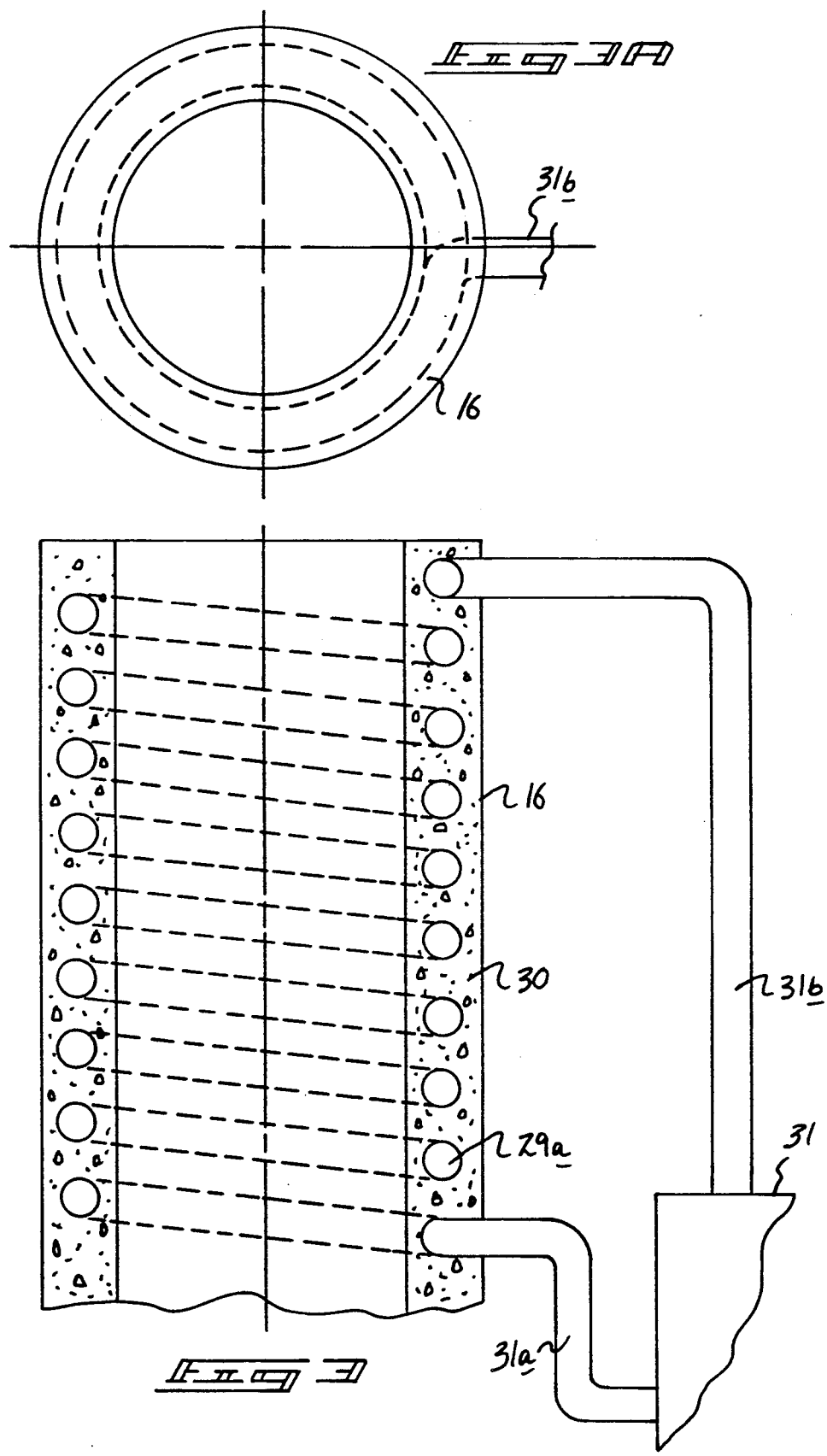
FIG. 3 is an orthographic cross-sectional illustration of a modification of the heating tube utilized by the instant invention.
Figure 4:
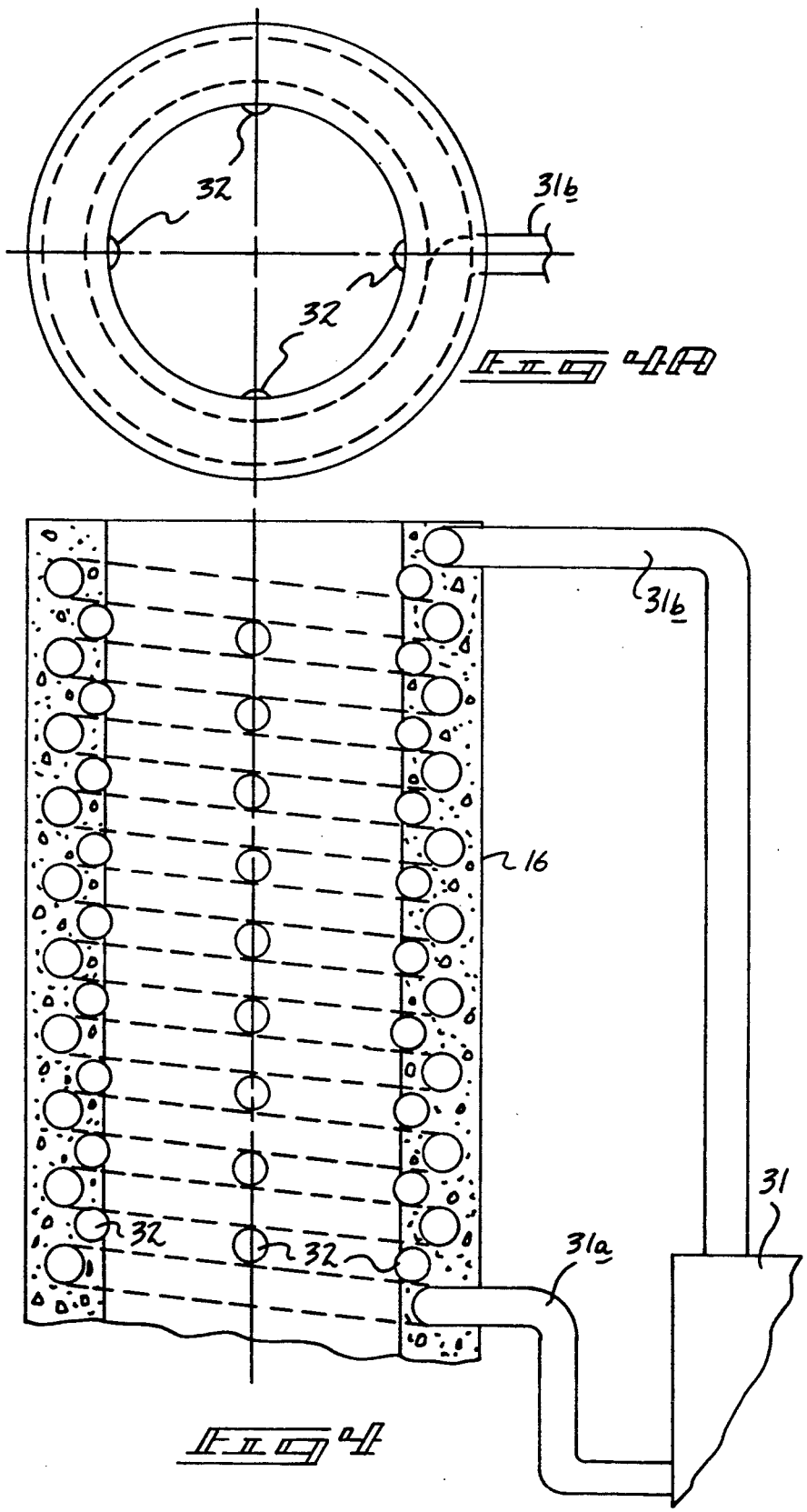
FIG. 4 is an orthographic cross-sectional illustration of a further modified heating tube utilized by the instant invention.

With reference now to the drawings, and in particular to FIGS. 1 to 5 thereof, a new and improved energy conversion apparatus embodying the principles and concepts of the present invention and generally designated by the reference numeral 10 will be described.

More specifically, the energy conversion apparatus 10 of the instant invention essentially comprises a base housing 11, including spaced side walls 12 orthogonally mounting a lower support axle 13 rotatably therethrough. A lower pulley 14 is mounted about the lower support axle, with the housing including a top wall 15 accommodating a first tubular heating conduit 16 and a second tubular cooling conduit 17. The first conduit 16 includes a first conduit outlet opening at an upper terminal end thereof, with the second conduit 17 including a second conduit inlet opening 19 mounted at an upper terminal end thereof. A support platform 26 is fixedly mounted adjacent to and spaced from the upper terminal ends of the first and second conduits 16 and 17. An upper support axle 21 is mounted orthogonally through an axle support flange 20 that in turn is mounted to the support platform 26. The upper support axle 21 mounts an upper pulley 22 thereto. An endless flexible conveyor belt 23 is wound about the upper and lower pulleys 22 and 14 and includes a series of equally spaced flexible enclosed fluid-filled balloon members 24, wherein the balloon members are filled with a fluid such as water to permit expansion of the water from a fluid to a vapor when heated within the first heating conduit 16. Emergence of each of the balloon members 24 from the outlet opening 18 of the first conduit directs the balloons about the upper pulley 22 and then into the cooling or second tubular conduit 17 where the balloons are then directed downwardly therefrom into a cooling fluid bath 25 maintained at temperatures generally less than two hundred degrees F. The second conduit includes a second conduit lower exit opening 27 in communication with the cooling fluid bath 25 at a lower terminal end of the second conduit, wherein the first conduit includes a first conduit lower entrance opening 28 in communication with the cooling fluid bath 25. Heating elements 29 are wound in a serpentine configuration within the wall structure 30 of the first conduit, wherein in the heating elements 29, a spiral conduit 29a is provided (see FIG. 3) wherein super heated steam at temperatures above three hundred degrees F. are directed therethrough from an inlet pipe 31 directed into a lower terminal end of the spiral conduit 28 and directed outwardly therefrom from an outlet pipe 31b from an upper terminal end of the conduit 29a. In this manner, the fluid within the balloons 24 is vaporized and effects their ascent upwardly through the first conduit 16. If required, a cooling pump 41 (see FIG. 2) is provided, with a cooling pump inlet 41a directing cooling fluid through a serpentine cooling conduit 42 directed about an interior wall of the second conduit 17.

A modification of the first conduit 16 includes sets of roller bearings 32 spaced at ninety degree intervals about the interior wall of the first conduit 16 projecting interiorly of the first conduit to assist in transit of the balloons 24 therethrough, as well as providing heat sinks for effecting continuous heat imparting characteristics to the balloons 24 as they are directed through the first conduit 16 converting the fluid into a vapor to enhance their rising and cooling the associated conveyor belt 23 therealong.

Figure 5:
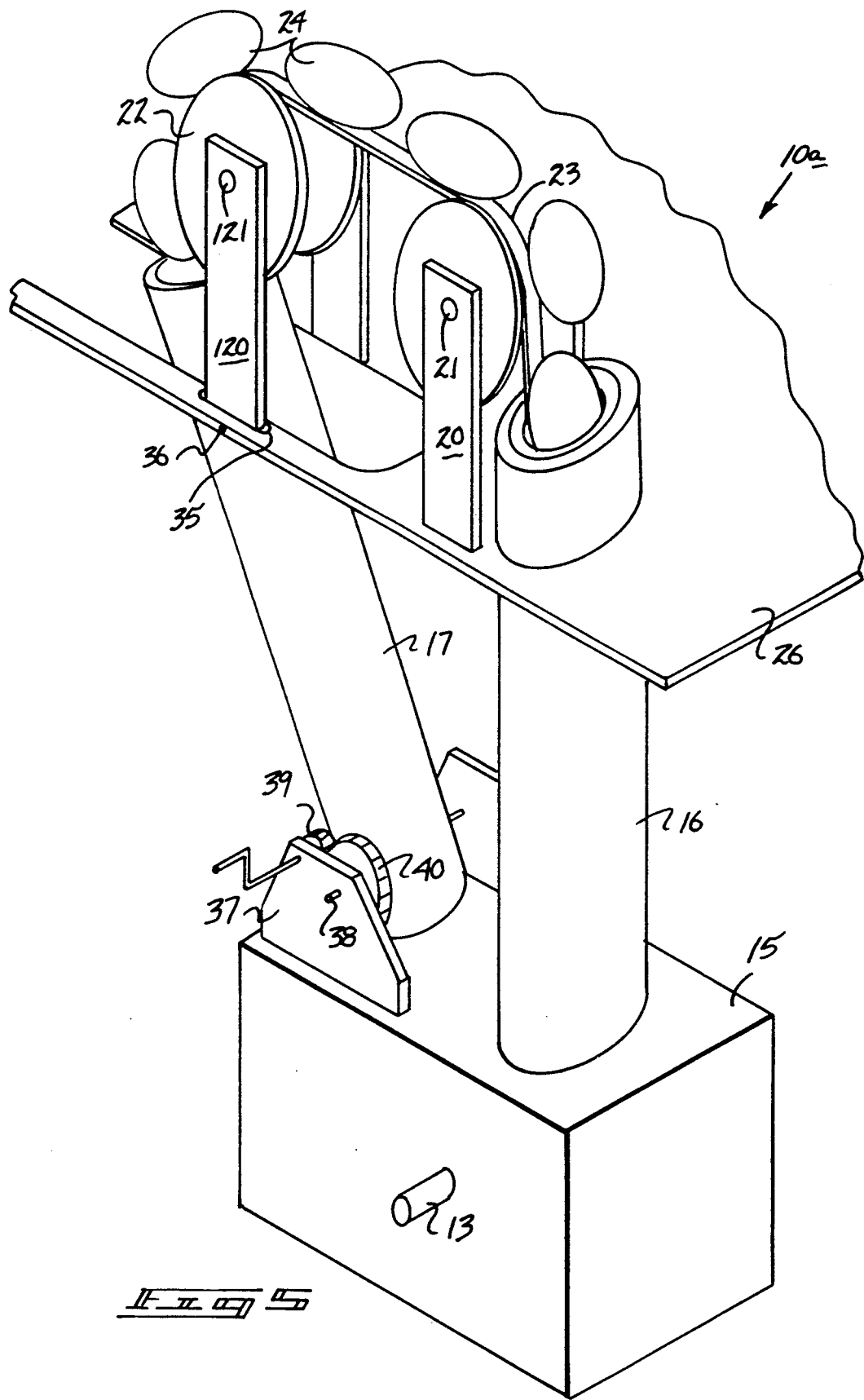
FIG. 5 is a modified organization of the instant invention utilizing a pivotally mounted cooling tube.

The apparatus 10a, as illustrated in FIG. 5, utilizes a modified second tube 17 that is pivotally mounted about a lower second tube pivotal axle 38 utilizing a drive gear 39 and a driven gear 40 to effect angulation of the second tube relative to the housing 15 and the associated platform 26. A second axis support flange 120 is provided mounting a second axle 121 in spaced relationship relative to the first upper support axle 21 and first flange 20 to provide desired tensioning of the conveyor belt 23, as well as changing the angulation of the second tube 17 and further permitting pivotment of the second flange 120 within an associated platform slot 35. In this manner, the balloons 24 are cooled in a greater degree upon emergence from the first tube 16.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be ted by Letters Patent of the United States is as follows:

1. An energy conversion apparatus, comprising,
    a base housing, the base housing including a cooling fluid bath contained therewithin, the base housing including a top wall;
    a first heating conduit mounted to and projecting into the base housing through the top wall;
    a second cooling conduit mounted to the top wall projecting therethrough;
    a lower pulley rotatably mounted within the base housing, with the lower pulley including a lower pulley axle mounted within the base housing, with the lower pulley positioned within the cooling fluid bath;
    a platform spaced above the base housing, the platform mounting the first conduit and the second conduit relative thereto in a spaced relationship relative to the base housing;
    an upper pulley, the upper pulley including an upper pulley axle, and a support flange, the support flange mounted to the support platform, with the upper pulley axle mounted to the support flange;
    an endless belt wound about the upper and lower pulleys directed through the first conduit and the second conduit;
    a plurality of equally spaced fluid filled balloons mounted upon the endless belt;

heating means for effecting heating interiorly of the first conduit for effecting vaporizing of the fluid within the balloons when directed therethrough to effect ascent of the balloons through the first conduit and descent of the balloons through the second conduit.

2. An apparatus as set forth in claim 1 wherein the heating means includes a continuous spiral conduit directed through the first conduit, and the spiral conduit including a super heated steam generator, wherein the super heated steam generator includes a first generator conduit directed into the spiral heating conduit at a lower terminal end thereof, and the steam generator including a steam generator upper conduit mounted to an upper terminal end of the spiral heating conduit adjacent an upper terminal end of the first conduit, and the steam generator directing super heated steam through the spiral heating conduit.

3. An apparatus as set forth in claim 2 including plural sets of roller bearings extending interiorly of the first conduit, wherein each roller bearing of each set of roller bearings is spaced apart ninety degrees relative to one another positioned between the spiral heating conduit.

4. An apparatus as set forth in claim 3 wherein in the second conduit includes a cooling conduit wound within the second conduit, and a cooling pump mounted within the cooling fluid bath to direct cooling fluid through the cooling conduit.

5. An apparatus as set forth in claim 4 wherein the second conduit includes a lower second conduit pivot axle, and the lower conduit second pivot axle includes a driven gear and a drive gear mounted adjacent a driven gear, whereupon rotation of the drive gear relative to the driven gear effects pivotment of the second conduit relative to the first conduit, and a further flange member mounted adjacent the support flange, wherein the further flange member mounts a further upper axle, the further upper axle mounting a further pulley, wherein the further pulley receives the endless belt thereabout, and pivotment of the second conduit relative to the first conduit permits tilting of the second conduit relative to the first conduit and enhanced communication of the balloons within a cooling atmosphere above the support platform.

* * * * *